US011353951B2

(12) United States Patent
Mehandjiysky et al.

(10) Patent No.: US 11,353,951 B2
(45) Date of Patent: Jun. 7, 2022

(54) COMPUTING INPUT DEVICES WITH SENSORS CONCEALED IN ARTICLES OF CLOTHING (71) Applicant: Hewlett-Packard Development Company, L.P., Spring, TX (US)

(72) Inventors: Dimitre Mehandjiysky, Spring, TX (US); Busarin Chumnong, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/042,979

(22) PCT Filed: Jun. 8, 2018

(86) PCT No.: PCT/US2018/036594
§ 371 (c)(1),
(2) Date: Sep. 29, 2020

(87) PCT Pub. No.: WO2019/236096
PCT Pub. Date: Dec. 12, 2019

(65) Prior Publication Data
US 2021/0103332 A1    Apr. 8, 2021

(51) Int. Cl.
*G06F 3/01* (2006.01)
*G06F 1/16* (2006.01)
*G06F 3/041* (2006.01)

(52) U.S. Cl.
CPC .............. *G06F 3/011* (2013.01); *G06F 1/163* (2013.01); *G06F 3/016* (2013.01); *G06F 3/041* (2013.01)

(58) Field of Classification Search
CPC .......... G06F 3/011; G06F 1/163; G06F 3/016; G06F 3/041
See application file for complete search history.

(56) References Cited

U.S. PATENT DOCUMENTS

| 6,801,140 B2 * | 10/2004 | Mantyjarvi ............ A41D 1/005 24/381 |
| 2008/0091097 A1 * | 4/2008 | Linti ................... A61B 5/6804 600/389 |
| 2014/0070957 A1 | 3/2014 | Longinotti-Buitoni et al. |

(Continued)

FOREIGN PATENT DOCUMENTS

JP    2015504616    2/2015

OTHER PUBLICATIONS

Schneegass et al., Gesturesleeve: Using Touch Sensitive Fabrics for Gestural Input On the Forearm for Controlling Smartwatches, Sep. 12-16, 2016; 8 pages.

(Continued)

*Primary Examiner* — Terrell M Robinson
(74) *Attorney, Agent, or Firm* — Fabian VanCott (57) ABSTRACT In one example in accordance with the present disclosure, a computing input device is described. The computing input device includes an article of clothing to be worn by a user. An array of sensors is embedded in the article of clothing and receives a touch input. The array of sensors is concealed within the article of clothing. The computing input device also includes a control system to convert the touch input to the array of sensors into a computing input.

19 Claims, 8 Drawing Sheets (56) References Cited

U.S. PATENT DOCUMENTS

| | | | |
|---|---|---|---|
| 2014/0176439 A1* | 6/2014 | Keller | G06F 3/0233 |
| | | | 345/159 |
| 2014/0288438 A1 | 9/2014 | Venkatraman et al. | |
| 2015/0062167 A1 | 3/2015 | Park et al. | |
| 2015/0370320 A1 | 12/2015 | Connor | |
| 2016/0085246 A1* | 3/2016 | Byl | G05D 11/134 |
| | | | 137/7 |
| 2016/0259404 A1 | 9/2016 | Woods | |
| 2016/0283101 A1* | 9/2016 | Schwesig | G06F 3/0488 |
| 2016/0321955 A1* | 11/2016 | Zhu | G09B 21/007 |
| 2017/0185183 A1* | 6/2017 | Sundararajan | G06F 3/04883 |
| 2017/0249033 A1* | 8/2017 | Podhajny | G06F 3/044 |
| 2017/0332946 A1 | 11/2017 | Kikkeri | |

OTHER PUBLICATIONS

Poupyrev et al., Project Jacquard: Interactive Digital Textiles At Scale, Everyday Objects as Interaction Surfaces, 2016, 12 pages, San Jose CA.

Troster, The Agenda of Wearable Healthcare, IMIA Yearbook of Medical Informatics 2005, 2004, pp. 125-138.

* cited by examiner

COMPUTING INPUT DEVICES WITH SENSORS CONCEALED IN ARTICLES OF CLOTHING

BACKGROUND

Computing applications and systems rely on input from a user to operate. That is, a user via an input device such as a keyboard or a touchpad, control the operation of the computing application and system. In one specific example, enhanced reality systems allow a user to become immersed in an enhanced reality environment wherein they can interact with the enhanced reality environment. In this example, the input devices allow a user to interact with, and become immersed in, any desired virtual scene. Such enhanced reality applications also provide visual stimuli, auditory stimuli, and can track user movement to create a rich immersive experience.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing applications and systems rely on input from a user to operate. That is, a user via an input device such as a keyboard or a touchpad, control the operation of the computing application and system. In one specific example, enhanced reality systems allow a user to become immersed in an enhanced reality environment wherein they can interact with the enhanced reality environment. In this example, the input devices allow a user to interact with, and become immersed in, any desired virtual scene. Such enhanced reality applications also provide visual stimuli, auditory stimuli, and can track user movement to create a rich immersive experience.

Enhanced reality systems include virtual reality (VR) systems, augmented reality (AR) systems, and mixed reality (MR) systems. Such enhanced reality systems can include enhanced reality headsets to generate realistic images, sounds, and other human discernable sensations that simulate a user's physical presence in a virtual environment presented at the headset. A VR system includes physical spaces and/or multi-projected environments. AR systems may include those systems and devices that implement live direct and/or indirect displays of a physical, real-world environment whose elements are augmented by computer-generated sensory input such as sound, video, graphics and/or GPS data. MR systems merge real and virtual worlds to produce new environments and visualizations where physical and digital objects co-exist and interact in real time. For simplicity, VR systems, AR systems, and MR systems are referred to herein as enhanced reality systems.

While such enhanced reality systems have undoubtedly provided a valuable tool in many industries as well as a source of diversion for users, some characteristics impede their more complete implementation. For example, when interacting with an enhanced reality environment, a user provides inputs via hand movements in a space in front of the user. Doing so may be socially awkward to a use, especially when in a populated space. The social awkwardness may be a barrier to entry for many individuals. Moreover, hand movements in the air do not provide the user with the tactile feedback that comes from physical input devices, making input more complex and more imprecise. This too may lead to a less satisfactory user experience.

Accordingly, the present specification describes a system that allows a user to provide input to a computing system, in particular input to an enhanced reality system, in a natural and non-obtrusive manner. As described herein, the input devices are disposed on an article of clothing worn by the user. Specifically, an array of sensors through which a touch input is provided, is concealed in an article of clothing. A user, by touching the article of clothing where the sensor array is disposed, can interact with the computing system such as an enhanced reality system.

Specifically, the present specification describes a computing input device. The computing input device includes an article of clothing to be worn by a user. An array of sensors embedded in the article of clothing receives a touch input. The array of sensors is concealed within the article of clothing and is not visible to the public. The computing input device also includes a control system to convert the touch input at the array of sensors into a computing input.

The present specification also describes a method. According to the method, an enhanced reality environment is displayed via an enhanced reality headset. Input is then received from a concealed array of sensors that is embedded in an article of clothing worn by a user. The input is converted into a signal to alter the enhanced reality environment.

The present specification also describes an enhanced reality system. The system includes an enhanced reality headset and a computing input device. The computing input device includes an article of clothing to be worn around the legs of a user. The computing input device also includes an array of sensors that are 1) embedded in the article of clothing to receive a touch input, 2) concealed within the article of clothing, and 3) disposed over a thigh region of the article of clothing. In this example, a patch of smooth material is disposed over the array of sensors. The computing input device also includes a control system to convert the touch input at the array of sensors into an input for an enhanced reality environment.

In summary, such a computing input device 1) provides a non-obtrusive touch input surface; 2) provides the touch input surface at a position that is comfortable and a natural and ergonomic resting place for a users hand; 3) is discrete, thus relieving social awkwardness when using an enhanced reality system; 4) provides tactile feedback to enhance precision of the input; and 5) provides an input without causing the user any discomfort. However, the devices disclosed herein may address other matters and deficiencies in a number of technical areas.

Figure 1:
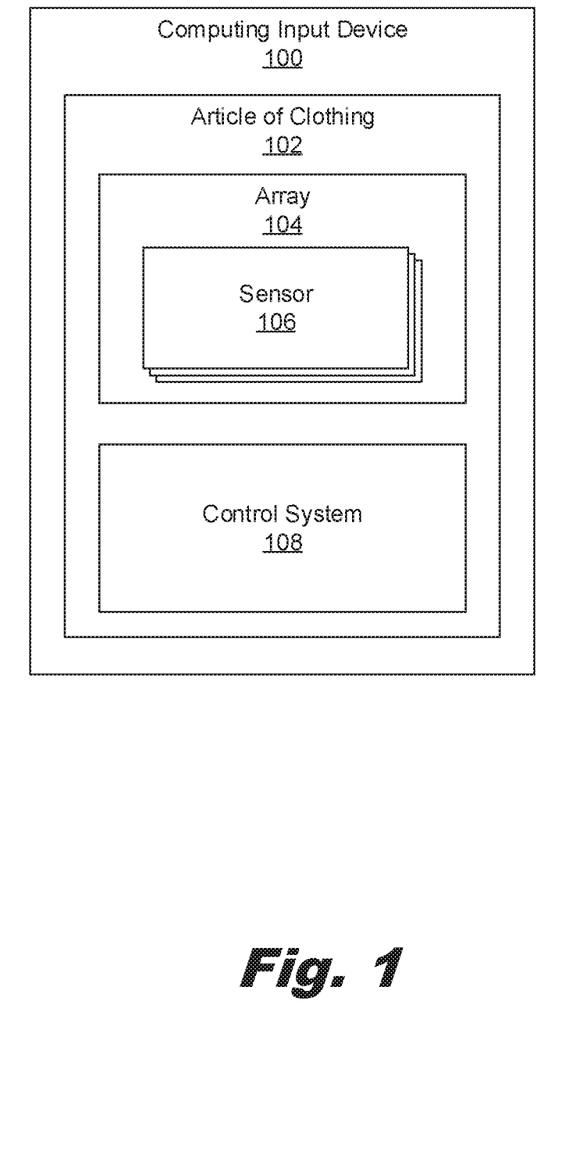
FIG. 1 is a block diagram of a computing input device with sensors concealed in an article of clothing, according to an example of the principles described herein.

Turning now to the figures, FIG. 1 is a block diagram of a computing input device (100) with sensors (106) concealed in an article of clothing (102), according to an example of the principles described herein. The article of clothing (102) may be of varying types. The article of clothing (102) may cover a torso and arms of a user, for example the article of clothing (102) may be a shirt or a sleeve. The article of clothing (102) may be worn around the legs of a user, for example pants, shorts, a skirt, or a dress. In some examples, the article of clothing (102) may be sized to fit a particular individual and may provide either a loose fit or a tight fight.

Within the article of clothing (102) is an array (104) of sensors (106). The array (104) may be in any pattern. For example, the sensor (106) elements may be disposed in a grid pattern. The array (104) may be any size and may be selected based on the application and/or position of the array (104). For example, an array (104) disposed on a shirt sleeve may be smaller in size as compared to an array (104) disposed on a pant leg. Moreover, while particular reference is made to a grid array (104) that is disposed on a pant leg or a shirt sleeve, the array (104) may be disposed on other areas of the article of clothing (102) and may be in patterns other than a grid.

The sensor (106) elements may be of varying types. For example, the sensors (106) may be touch sensors (106) that receive a touch input from a user. In another example, the sensors (106) may be proximity sensors. In this case, a user may not need to touch the sensor (106) to effectuate an input. Rather, the user could simply provide an input by gesticulation within a predetermined distance above the array (104) of sensors (106).

Returning to the array (104), the array (104) may be concealed within the article of clothing (102). As described above, a user may be embarrassed and therefore not use an enhanced reality system if the system relied on grand movements of the arms and/or hands to generate an input. Similarly, if the article of clothing (102) had a visible array (104) which could draw the attention of other people a user may be disinclined to use this system as an input device. Accordingly, the array (104), by being concealed within the article of clothing (102), does not draw attention and thus may encourage a user to interact with an enhanced reality environment. Moreover, concealing the array (104) may be more aesthetically appealing.

In some examples, the array (104) of sensors (106) may be attached to an inside portion of the article of clothing (102). That is, using an adhesive, individual sensor (106) elements may be adhered to the inside surface of the article of clothing (102).

The computing input device (100) also includes a control system (108) which may reside on the article of clothing (102). The control system (108) receives the touch input and either converts the touch input into a signal usable by the computer application, i.e., the enhanced reality system, or transmits the touch input data to another computing device which interprets and processes the touch input.

Accordingly, the computing input device (100) described herein provides a touch input surface which can be discretely with the user at all times. That is, the sensor (106) array (104) may be formed to appear as regular clothing and a user could simply connect the sensor (106) array (104) to an applicable computing device as desired. Moreover, a concealed array (104) within the article of clothing (102) does not draw attention to the user, thus providing a discrete manner in which to interact with a computing device such as an enhanced reality system.

Figure 2:
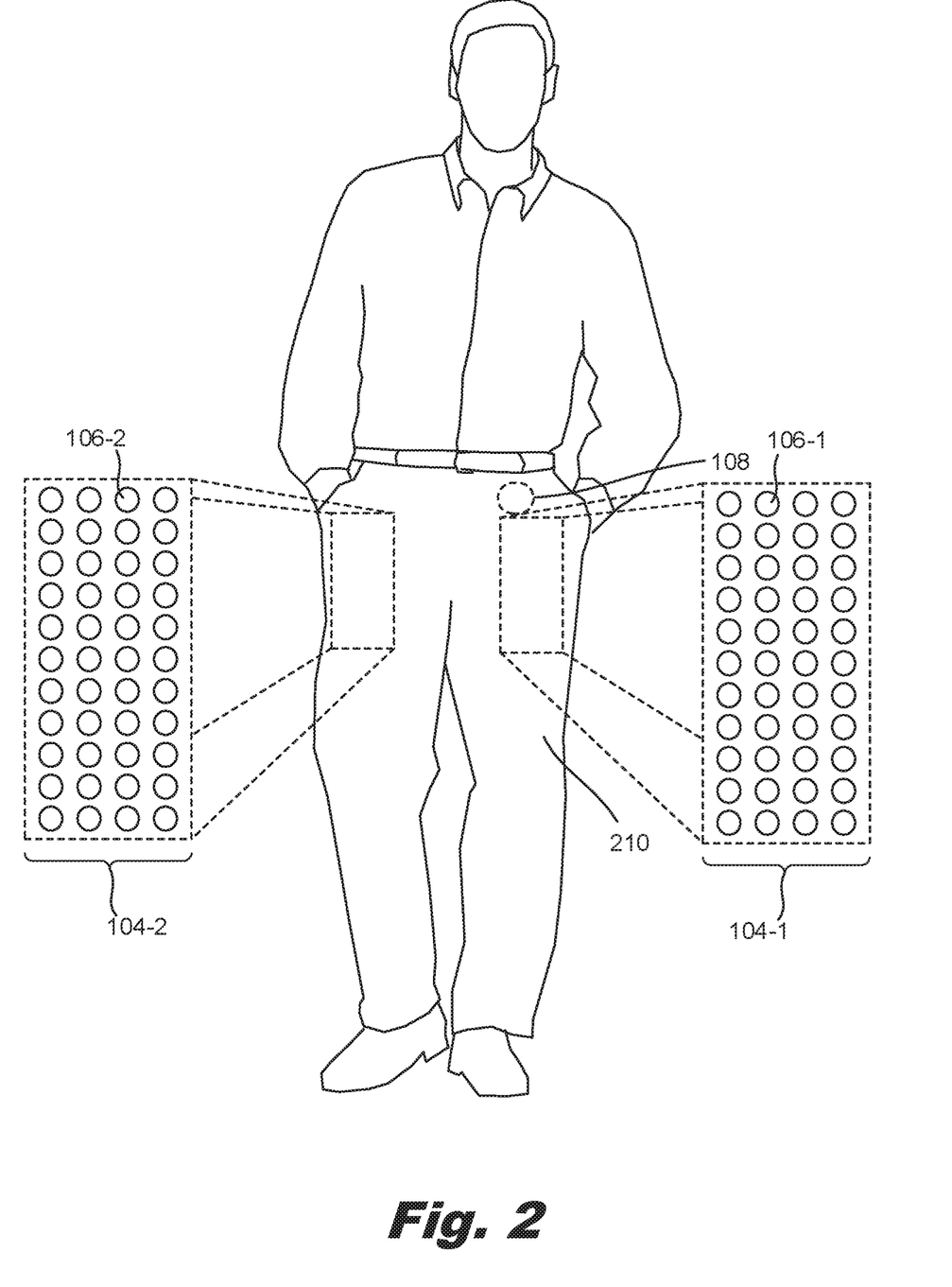
FIG. 2 is a diagram of a computing input device with sensors concealed in a pant leg, according to an example of the principles described herein.

FIG. 2 is a diagram of a computing input device (FIG. 1, 100) with sensors (106) concealed in a pair of pants (210), and more particularly in a pant leg, according to an example of the principles described herein. For simplicity in FIG. 2, just one instance of a sensor (106) in each array (104) has been indicated with a reference number. Note that while FIG. 2 and others depict an array (104) of sensors (106) disposed in a pair of pants (210), the array (104) may be disposed on any article of clothing (FIG. 1, 102) that covers the legs, such as a skirt, a dress, or shorts.

In some examples, arrays (104-1, 104-2) may be disposed on either side of the pair of pants (210). In so doing, the computing input devices (FIG. 1, 100) can be used by either-handed users. That is, left-handed users may use one array (104-1) and right-handed users may use a second array (104-2). Moreover, in some examples, a user may use both arrays (104) to further increase the operations that can be performed.

As described above, the arrays (104) of sensors (106) may be formed in region that are natural and ergonomic. Accordingly, in this example, the article of clothing (FIG. 1, 102) is a pair of pants (210) and the arrays (104-1, 104-2) of sensors (106) is disposed over a thigh portion of the pants (210).

Positioning the arrays (104) over thigh portions of the pants (210) provides a placement of the arrays (104) of sensors (106) that is ergonomic, comfortable, and natural for a user. More particularly, the arrays (104) of sensors may be disposed on a front surface of the thigh, and may be on an inward or outward portion of the thigh. When a user is seated, this front surface may face upward, that is it may not be in contact with the seat. That is, the front surface may refer to a surface of the pants (210) when a user is standing and that portion may be referred to as a top portion when seated. In this example, the arrays (104) of sensors may be disposed on a top portion, or upward facing portion of the thigh. More specifically, the arrays (104) may be on inward portions of the pants (210), the inward portion being that portion proximate an individual's other thigh. In other words, the array (104-1) on one pant (210) leg may face the other array (104-2) on the other pant (210) leg. In these examples, the arrays (104) may be disposed entirely on the inward top portion of the pant (210) leg.

In another example, the arrays (104) may be disposed on an outward top portion of the thigh, the outward portion being that portion facing away from the user's other thigh. More specifically, the arrays (104-1) on one pant (210) leg may face away from the other array (104-2) on the other pant (210) leg. In these examples, the arrays (104) may be disposed entirely on the outward top portion of the pant (210) leg.

Still further, the arrays (104) may be positioned over a central location of the thigh portion of the pants (210), for example where a user's hand naturally comes to rest when seated. More specifically, this central location may be between a hip joint of the user and a knee joint of the user. The location on the thigh where the arrays (104) are positioned may be selected based on their being a natural resting place of a user's hand and therefore may provide a comfortable and ergonomic interface for a user to interact with.

In some examples, the arrays (104) conform to the shape of the leg. That is, the fabric that makes up the pants (210) is flexible and bends as a user moves and sits. Similarly, the individual sensors (106) may form arrays (104) that are flexible as a result of spacing between adjacent sensor (106) elements. In this fashion, as a user sits, the arrays (104) conform to the shape of the leg thus becoming a curved array (104) that the user can rely on to provide input to the computing device or enhanced reality system.

Moreover, as described above, the arrays (104) may be concealed and therefore not visible to passersby. Accordingly, in FIG. 2, the arrays (104) are depicted in dashed lines to indicate their position internal to the article of clothing (FIG. 1, 102). In this example, the arrays (104) may be attached to an underside of the pant leg. In this fashion, the arrays (104) are still accessible and serviceable. For example, were the array (104) interwoven with the fabric of the article of clothing (102), it would be complicated to remove the sensors (106) to repair and/or replace them. By comparison, adhering the sensors (106) to an underside alleviates this condition and renders them accessible and easily repaired/replaced.

In some examples each array (104) also includes circuitry. That is, as described above, the control system (108) may transmit and/or convert touch input received at the arrays (104). Accordingly, each array (104) may include circuitry coupling the control system (108) to the array (104).

As with the arrays (104), the control system (108) may be internal to the article of clothing (FIG. 1, 102) and may be hidden from view. While FIG. 2 depicts the control system (108) as being disposed at a particular location, the control system (108) may be placed anywhere on the garment. Moreover, while FIG. 2 depicts a single control system (108) that controls both arrays (104), in some examples, a second control system (108) is present to control the second array (104-2).

As described above, the sensors (106) may receive touch input which input is converted and used to manipulate an enhanced reality environment. For example, a user may slide their finger along an array (104) which sliding motion could be converted into movement of a cursor within an enhanced reality environment. In another example, a user may tap on a sensor (106) array (104) which carries out a particular action like selection of some components displayed on the enhanced reality system.

Note that while FIG. 2 depicts multiple arrays (104), in some examples, the computing input device (FIG. 1, 100) may include a single array (104) disposed over one thigh.

Figure 3:
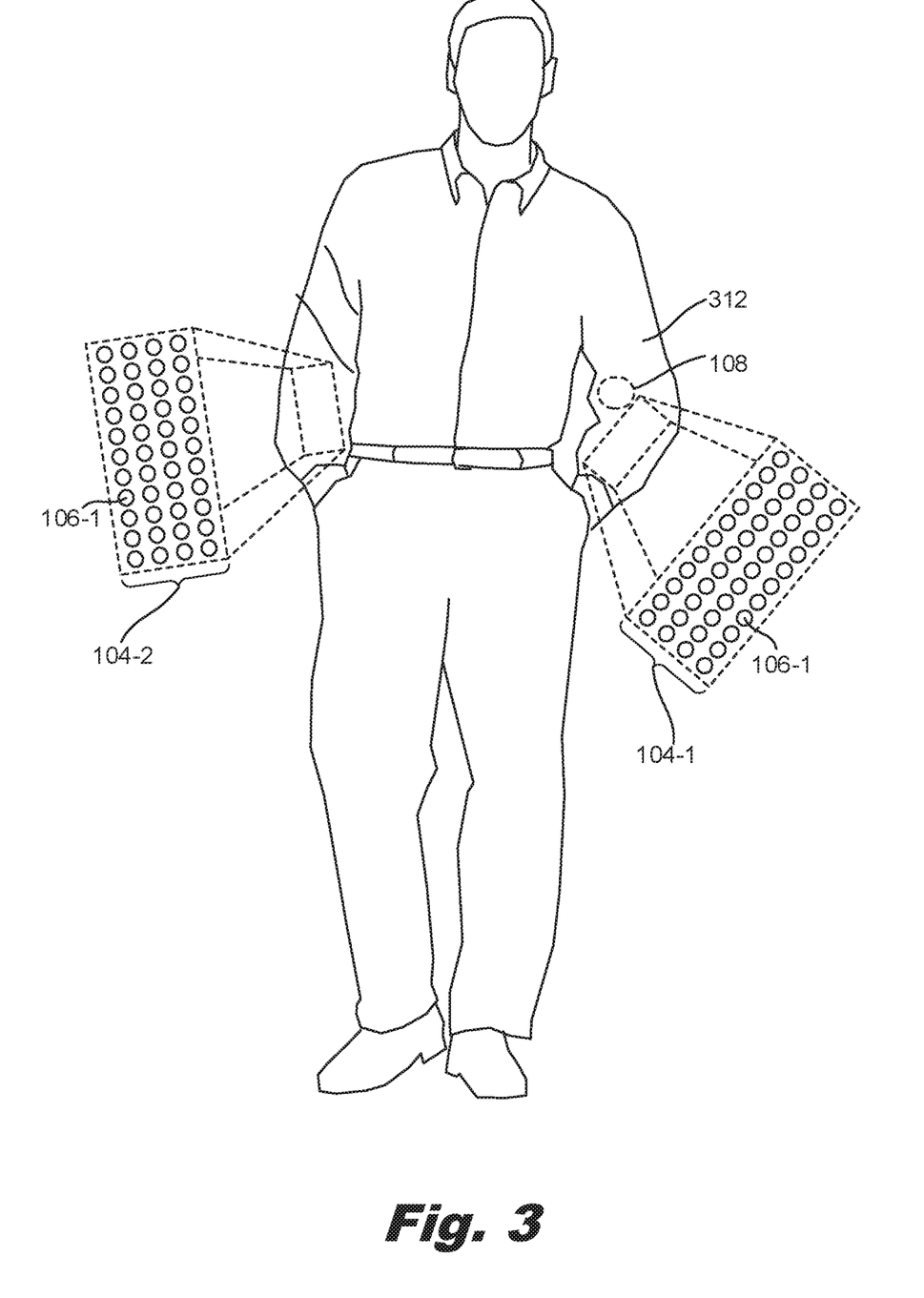
FIG. 3 is a diagram of a computing input device with sensors concealed in a shirt sleeve, according to an example of the principles described herein.

FIG. 3 is a diagram of a computing input device (FIG. 1, 100) with sensors concealed (106) in a shirt (312) sleeve, according to an example of the principles described herein. For simplicity in FIG. 3, just one instance of a sensor (106) has been indicated with a reference number. Note that while FIG. 3 depicts an array (104) of sensors (106) disposed in a shirt (312) sleeve, the array (104) may be disposed on any article of clothing (FIG. 1, 102) that covers the arms such as a sleeve not attached to a shirt.

In some examples, arrays (104-1, 104-2) may be disposed on either side of the shirt (312). In so doing, the computing input devices (FIG. 1, 100) can be used by either-handed users. That is, left-handed users may use one array (104-1) and right-handed users may use a second array (104-2). Moreover, in some examples, a user may use both arrays (104) to further increase the operations that can be performed.

As described above, the arrays (104) of sensors (106) may be formed in a region that is natural and ergonomic. Accordingly, in this example, the article of clothing (FIG. 1, 102) is a shirt (312) and the arrays (104) are disposed over forearm portions of the shirt (312). Positioning the array (104) over the forearm portions of the shirt (312) provides a natural ergonomic placement of the arrays (104-1, 104-2) of sensors (106) such that it is comfortable for a user. More particularly, the arrays (104) of sensors (106) may be disposed on a front surface of the forearm. This position on the forearm provides a location that is readily accessible to a user, and large enough allow easy input. That is, if the arrays (104) are too small, it may be difficult to record precise touch inputs.

In some examples, the arrays (104) can conform to the shape of the arm, That is, the fabric that makes up the shirt (312) is flexible and bends as a user moves. Similarly, the individual sensors (106) may form arrays (104) that are flexible as a result of spacing between individual sensor (106) elements. In this fashion, as a user moves, the arrays (104) conform to the shape of the arm thus becoming curved arrays (104) that the user can rely on to provide input to the computing device or enhanced reality system.

Moreover, as described above, each array (104) may be concealed from public view. Accordingly, in FIG. 3, the arrays (104) are depicted in dashed lines to indicate their position internal to the article of clothing (FIG. 1, 102). In this example, each array (104) may be attached to an underside of the shirt (312) sleeve. In this fashion, the arrays (104) is still accessible and serviceable. For example, were the arrays (104) interwoven with the fabric of the article of clothing (102), it would be complicated to remove the sensors (106) to repair and/or replace them. By comparison, adhering the sensors (106) to an underside alleviates this condition and renders them accessible and easily repaired/replaced.

In some examples each array (104) also includes circuitry. That is, as described above, the control system (108) may transmit and/or convert touch input received at the array (104). Accordingly, each array (104) may include circuitry coupling the control system (108) to the array (104).

As with the arrays (104), the control system (108) may be internal to the article of clothing (FIG. 1, 102) and may be hidden from public view. While FIG. 3 depicts the control system (108) as being disposed at a particular location, the control system (108) may be placed anywhere on the garment. Note that while FIG. 2 depicts multiple arrays (104), in some examples, the computing input device (FIG. 1, 100) may include a single array (104) disposed over one forearm.

Figure 4:
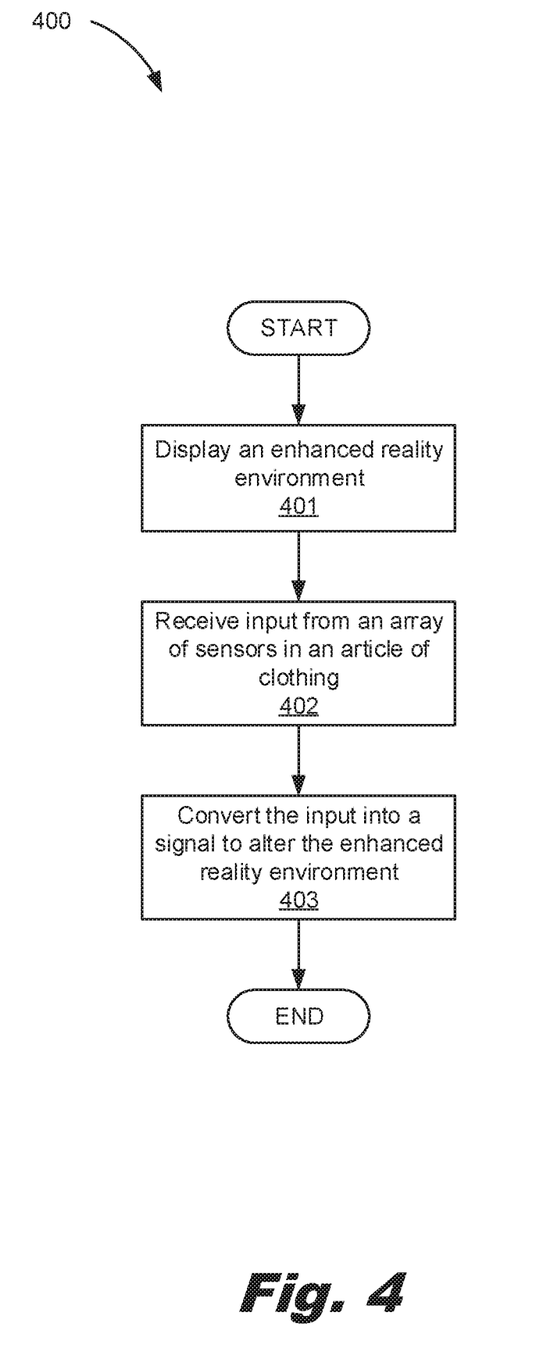
FIG. 4 is a flowchart showing a method of processing input from an array of sensors concealed in an article of clothing, according to an example of the principles described herein.

FIG. 4 is a flowchart showing a method (400) of processing input from an array (FIG. 1, 104) of sensors (FIG. 1, 106) concealed in an article of clothing (FIG. 1, 102), according to an example of the principles described herein. According to the method (400) an enhanced reality environment is displayed (block 401), Any number of devices may be used to display (block 401) such an enhanced reality environment. For example, the enhanced reality environment may be displayed on a computer screen or a television screen. In another example, a user may don a virtual reality headset. Using stereoscopic displays, the virtual reality headset may display (block 401) the enhanced reality environment.

Input is then received (block 402) from an array (FIG. 1, 104), or arrays (FIG. 1, 104) of sensors (FIG. 1, 106) that are concealed in an article of clothing (FIG. 1, 102). That is, a user may interface with any type of sensor (FIG. 1, 106) including, but not limited to, a touch sensor (FIG. 1, 106) and a proximity sensor (FIG. 1, 106). That input is received at a computing device and converted (block 403) into a signal that can alter the enhanced reality environment. For example, a swipe of a user's finger along the array (FIG. 1, 104) of sensors (FIG. 1, 106) disposed in a pant leg (FIG. 2, 210) may be used to scroll through a document in an enhanced reality environment. While particular reference is made to one type of user input that is received (block 402) and converted (block 403), any type of user input on the array (FIG. 1, 104) of sensors (FIG. 1, 106) may be received (block 402) and converted (block 403) into any environment-altering signal.

Figure 5:
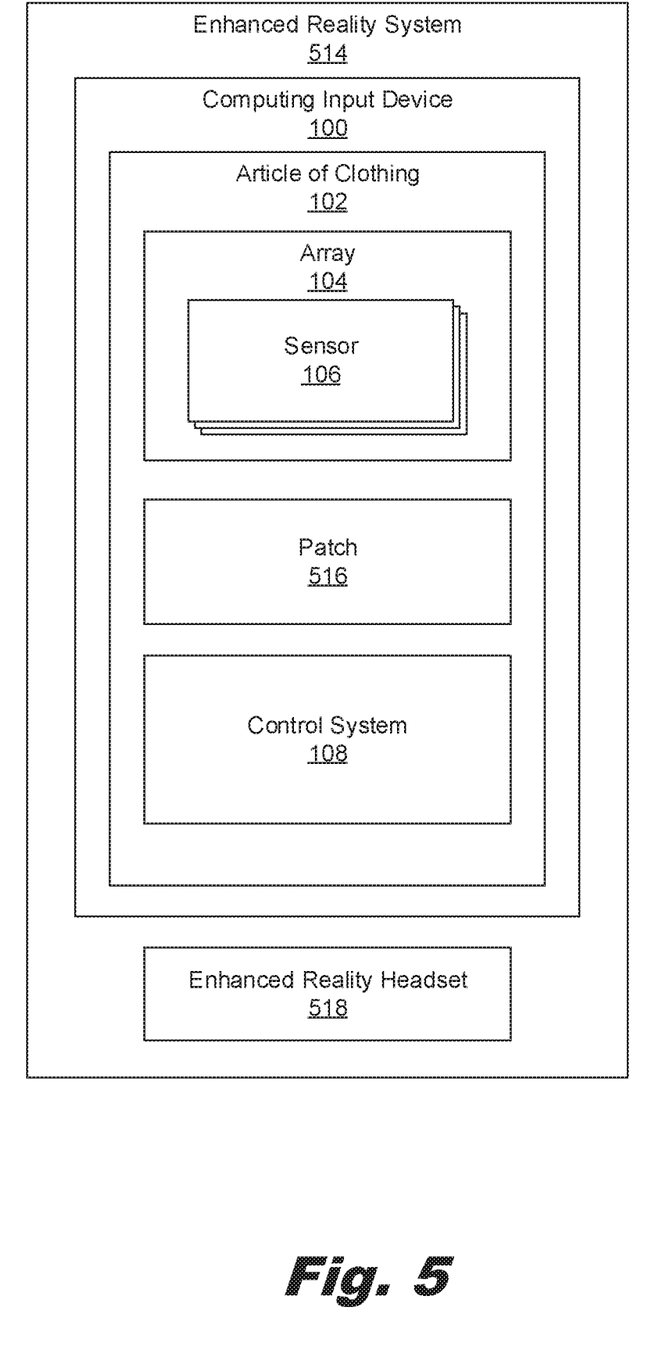
FIG. 5 is a block diagram of an enhanced reality system with sensors concealed in an article of clothing, according to an example of the principles described herein.

FIG. 5 is a block diagram of an enhanced reality system (514) with sensors (106) concealed in an article of clothing (102), according to an example of the principles described herein. In this example, the enhanced reality system (514) includes the computing input device (100) with its associated article of clothing (104), array (104) of sensors (106), and the control system (108) as described above. The enhanced reality system (514) also includes an enhanced reality headset (518) that, as described above, displays the enhanced reality environment to the user, whether the enhanced reality environment be VR, AR, or MR. As its name suggests, the enhanced reality headset (518) may be worn by a user and encompasses the entirety of their field of view such that a truly immersive experience is provided to the user.

In this example, the article of clothing (102) includes a patch (516) of smooth material that is disposed over the array (104) of sensors (106). The patch (516) provides a surface that provides for better touch input aesthetics. That is, fabric that makes up the article of clothing (102), while comfortable may not provide desirable feedback for a touch input surface. Accordingly, a portion of the article of clothing (102) may be replaced with a patch (516) of a different material that provides such a surface. For example, the patch (516) may be formed of a plastic or other material that has a low coefficient of friction such that a user's hand can slide easily over the surface to generate the touch input to be sensed by the underlying array (104) of sensors (106). Still further, the patch (516) may be a smooth surface without obstructions that might prevent a user's hand from sliding.

Figure 6:
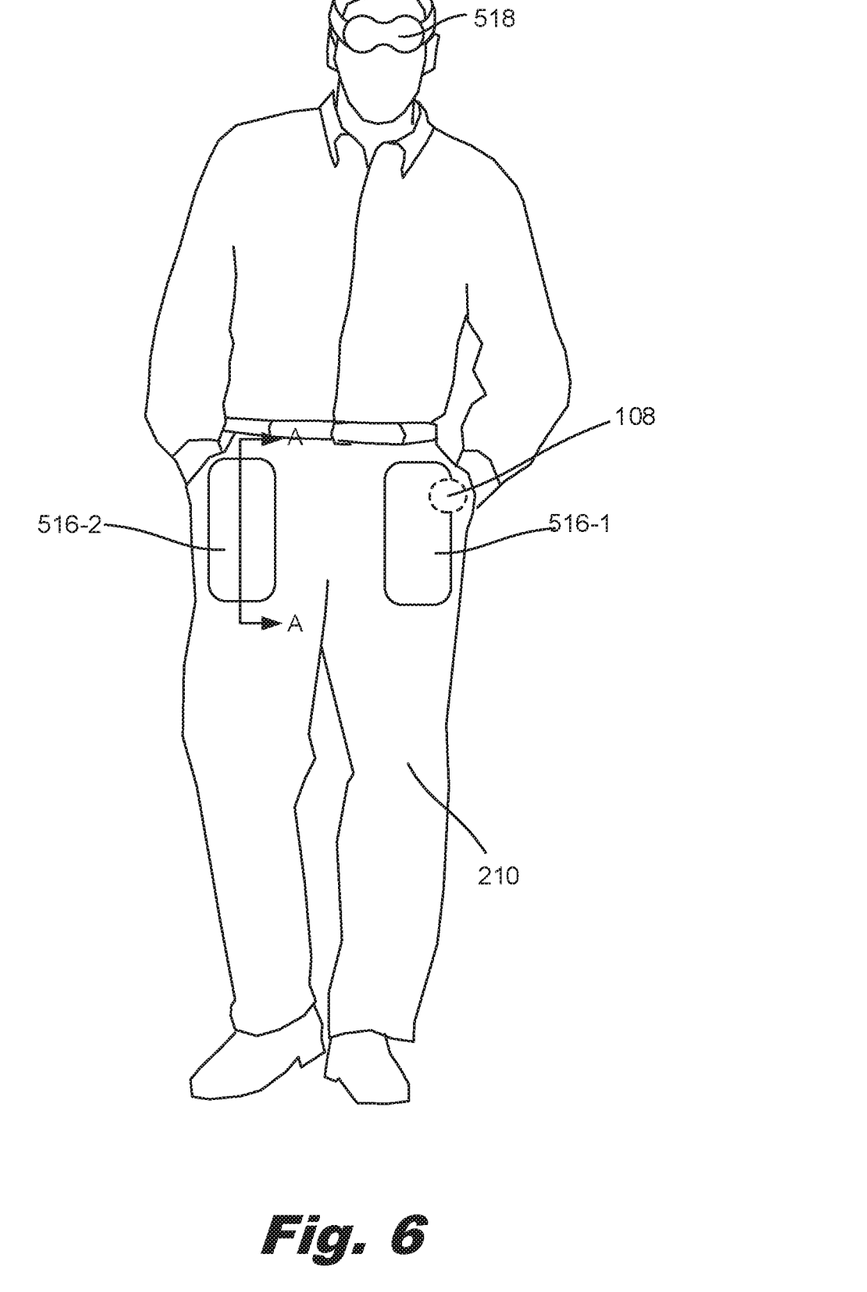
FIG. 6 is a diagram of an enhanced reality system with sensors concealed in a pant leg, according to an example of the principles described herein.

FIG. 6 is a diagram of an enhanced reality system (FIG. 5, 514) with sensors (FIG. 1, 106) concealed in a pant leg, according to an example of the principles described herein. FIG. 6 clearly depicts the patches (516-1, 516-2) of material covering respective arrays (FIG. 1, 104) that have a coefficient of friction less than the rest of the material on the pant leg. In this example, the control system (108) and arrays (FIG. 1, 104) of sensors (FIG. 1, 106) are disposed on an underside of the pant leg. As described above, incorporating the smooth material, such as silicon nylon, rubber, or other material, as opposed to cotton or polyester, may provide a more appealing tactile interface for a user. While FIG. 6 depicts the patches (516-1, 516-2) as being disposed over a pant leg, the patch (516) may be disposed over other regions where the array (FIG. 1, 104) may exist, such as on the forearm portion of a shirt (FIG. 3, 312) sleeve.

Figure 7:
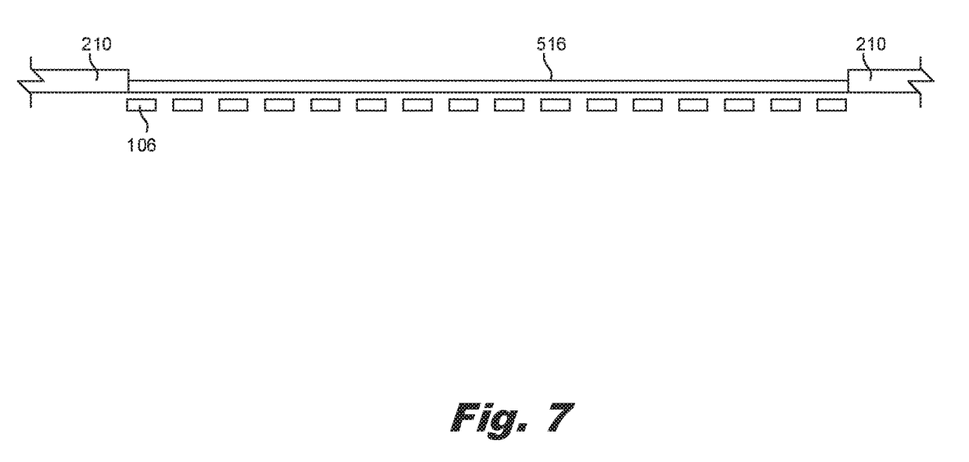
FIG. 7 is a cross-sectional diagram of sensors concealed in a pant leg, according to an example of the principles described herein.

FIG. 7 is a cross-sectional view of the pant leg concealing an array (FIG. 1, 104) of sensors (106), according to an example of the principles described herein, Specifically, FIG. 7 is a portion of the cross-section indicated by the line A-A in FIG. 6. This cross-sectional view clearly indicates the patch (516) of smooth material and the remaining portions of the pant (210) leg. In this example as described above, the sensors (106) are disposed underneath the article of clothing (FIG. 1, 102) so as to be discrete and invisible to the public.

Moreover as described above, FIG. 7 depicts the sensors (106) as being underneath, but not integrated with, the article of clothing (FIG. 1,102). In so doing, the sensors (106) remain accessible for repair/replacement. In such an example, the sensors (106) may be affixed via an adhesive or other mechanism, to the underside of the patch (516) of smooth material, or to the article of clothing (FIG. 1, 102) if no patch (516) is used.

Figure 8:
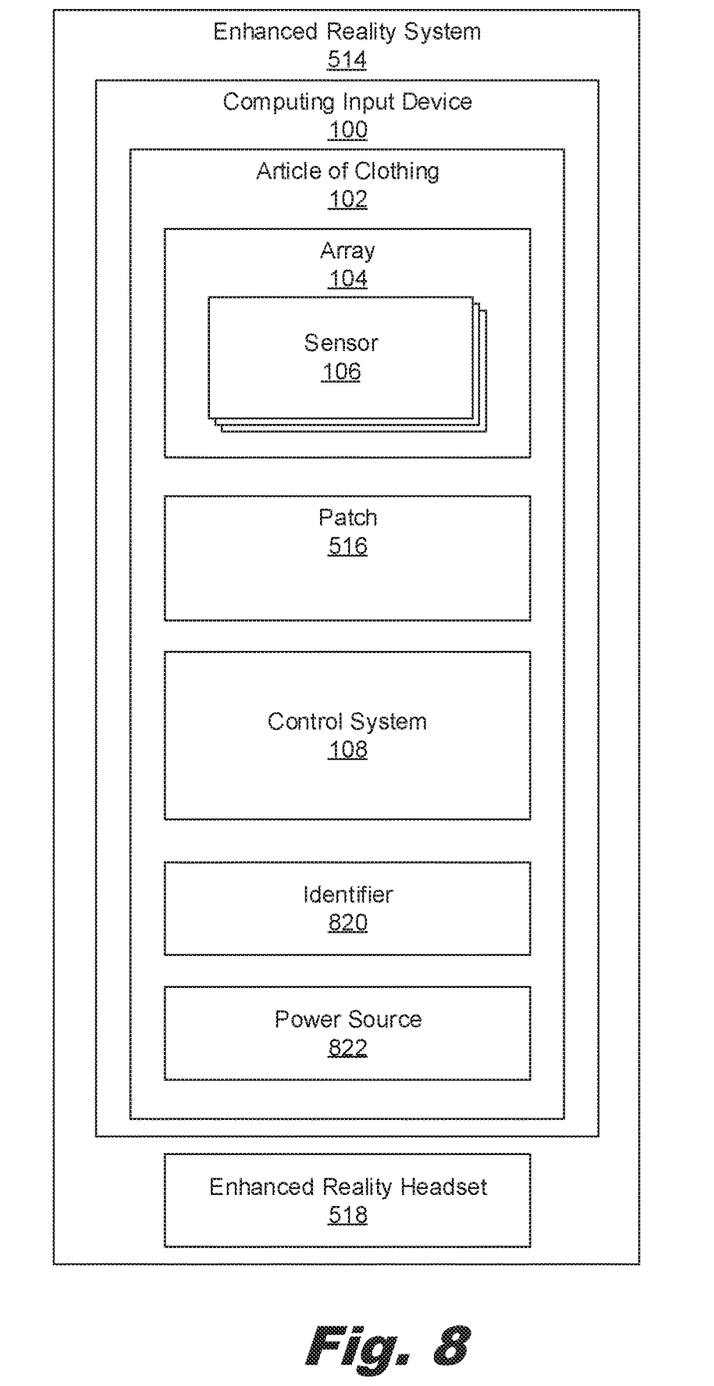
FIG. 8 is a block diagram of an enhanced reality system with sensors concealed in an article of clothing, according to an example of the principles described herein.

FIG. 8 is a block diagram of an enhanced reality system (514) with sensors (106) concealed in an article of clothing (102), according to an example of the principles described herein. In this example, the enhanced reality system (514) includes the computing input device (100) with its associated article of clothing (102), array (104) of sensors (106), patch (516), control system (108), and enhanced reality headset (518) as described above.

In some examples, the article of clothing (102) includes an identifier (820) to identify the array (104) of sensors (106) within the enhanced reality environment while being visually concealed outside the enhanced reality environment. For example, the identifier (820) may be an electrical marker. This marker, being placed on an underside of the article of clothing (102) is not visible to the public. However, such a marker may be mapped to a visual indication within the enhanced reality environment. Thus a user, via the enhanced reality headset (518) may be able to view the identifier (820) and know the location of the array (104) of sensors (106) while those not using the enhanced reality system (514) would not be able to see the identifier (820). In some examples, the identifier (820) identifies the border of the array (104) of sensors (106). In another example, the identifier (820) identifies each sensor (106) in the array (104) of sensors (106).

In another example, the identifier (820) may be a tactile identifier (820). That is, while the identifier (820) may be visually imperceptible, it may provide tactile indication of the sensors (106); for example as a clear material that has a different coefficient of friction from the article of clothing (102). Such an identifier can let a user know where touch input should be directed so that it is properly received by the array (104) and processed by the corresponding computing device.

In some examples, the article of clothing (102) includes a power source (822). The power source (822) provides power to the sensors (106) in the array (104) as well as to the processor (108) that controls the array (104) of sensors (106). In some examples the power source (822) may be a flexible battery. The flexible battery may be formed of a thin material that flexes, but does not plastically deform. That is, for a given amount of force, the flexible battery can conform to a shape, such as a leg or an arm. The power source (822) may be charged via a number of mechanisms. In one example, the power source (822) is charged via a tethering cable. In this example, the power source (822) is coupled to an electrical outlet and charged. In another example, the power source (822) is charged wirelessly. For example, the power source (822) may include embedded coils that allow the power source (822) to be re-charged without a physical connection. That is, the power source (822) may include components that when proximate to a charging station, replenish the flexible battery (214).

By including the power source (822) on the article of clothing (102), the article of clothing (102) operates as a standalone input device and powers the corresponding components. Doing so is advantageous as a user need not be tethered to a power source during use of the input device. Such a tethered power system can impede the immersive nature of the experience.

In summary, such a computing input device 1) provides a non-obtrusive touch input surface; 2) provides the touch input surface at a position that is comfortable and a natural and ergonomic resting place for a user's hand; 3) is discrete, thus relieving social awkwardness when using an enhanced reality system; 4) provides tactile feedback to enhance precision of the input; and 5) provides an input without causing the user any discomfort. However, the devices disclosed herein may address other matters and deficiencies in a number of technical areas.

What is claimed is:

1. A computing input device, comprising:
    an article of clothing to be worn by a user; an array of sensors embedded in the article of clothing to receive a touch input, wherein the array of sensors: is concealed within the article of clothing; is flexible; comprises multiple sensor elements spaced apart from one another to conform to a shape of the user; and is to detect movement user input across the multiple sensor elements; a tactile identifier to indicate a location of the array of sensors and to direct a user to a location where touch input is detectable; and a control system to convert the touch input at the array of sensors into a computing input.

2. The computing input device of claim 1, wherein the array of sensors are disposed on an interior portion of the article of clothing.

3. The computing input device of claim 1, wherein: the article of clothing is worn around a leg of the user; and the array of sensors is disposed over a thigh portion of the article of clothing.

4. The computing input device of claim 3, wherein the array of sensors is disposed over a top portion of the thigh portion of the article of clothing.

5. The computing input device of claim 4, wherein the array of sensors is disposed over at least one of: an inward-facing top portion of the thigh portion of the article of clothing; and an outward-facing top portion of the thigh portion of the article of clothing.

6. The computing input device of claim 1, wherein: the article of clothing is worn around an arm of the user; and the array of sensors is disposed over a forearm portion of the article of clothing.

7. The computing input device of claim 1, further comprising an identifier to identify the array of sensors within an enhanced reality environment while being concealed outside the enhanced reality environment.

8. The computing input device of claim 7, wherein the identifier indicates at least one of: a border of the array of sensors; and a location of each sensor of the array of sensors.

9. The computing input device of claim 1, wherein the article of clothing comprises a patch of material disposed over the array of sensors different from a material of the article of clothing.

10. The computing input device of claim 1, wherein the array of sensors is in a grid pattern.

11. The computing input device of claim 1, further comprising a flexible power source embedded in the article of clothing.

12. The computing input device of claim 1, wherein the tactile identifier is visually imperceptible.

13. A method, comprising:
    displaying an enhanced reality environment via an enhanced reality headset; receiving input from a concealed flexible array of sensors embedded in an article of clothing to be worn by a user, wherein the flexible array of sensors is formed under a patch of clear smooth material of a different type of fabric than remaining portions of the article of clothing; and
    converting the input into a signal to alter the enhanced reality environment.

14. The method of claim 13, further comprising providing operating power to the flexible array of sensors via at least one of a wireless connection and a wired connection.

15. An enhanced reality system, comprising:
    an enhanced reality headset; and a computing input device, comprising: an article of clothing to be worn around legs of a user; multiple arrays of sensors, wherein an array of sensors: is flexible; embedded in the article of clothing to receive a touch input; concealed within the article of clothing; disposed over a thigh portion of the article of clothing; comprises multiple sensors spaced apart from one another to conform to a shape of the user; and is to detect movement user input across the multiple sensor elements; a patch of clear smooth material disposed over the array of sensors;
    and a control system to convert the touch input to the array of sensors into an input for an enhanced reality environment.

16. The enhanced reality system of claim 15, wherein the array of sensors are selected from a group consisting of touch sensors and proximity sensors.

17. The enhanced reality system of claim 15, further comprising a power source disposed on the article of clothing.

18. The enhanced reality system of claim 15, wherein: a first array of sensors is disposed over a first pant leg of the article of clothing; and a second array of sensors is disposed over a second pant leg of the article of clothing.

19. The enhanced reality system of claim 18, wherein the first array of sensors and the second array of sensors face one another.

* * * * *